(12) United States Patent
Ota et al.

(10) Patent No.: US 7,309,548 B2
(45) Date of Patent: *Dec. 18, 2007

(54) LITHIUM SECONDARY BATTERY

(75) Inventors: Taeko Ota, Osaka (JP); Ryuji Ohshita, Tokushima (JP); Maruo Kamino, Kobe (JP)

(73) Assignee: Sanyo Electric Co., Ltd, Osaka (JP)

( * ) Notice: Subject to any disclaimer, the term of this patent is extended or adjusted under 35 U.S.C. 154(b) by 235 days.

This patent is subject to a terminal disclaimer.

(21) Appl. No.: 10/915,601

(22) Filed: Aug. 11, 2004

(65) Prior Publication Data

US 2005/0008939 A1    Jan. 13, 2005

Related U.S. Application Data

(62) Division of application No. 10/124,727, filed on Apr. 18, 2002, now Pat. No. 6,800,400.

(30) Foreign Application Priority Data

Apr. 19, 2001  (JP)  ............................ 2001-121171

(51) Int. Cl.
*H01M 6/18* (2006.01)

(52) U.S. Cl. .................. 429/307; 429/341; 429/231.95; 429/245; 429/324; 429/326; 429/330; 429/332; 429/233

(58) Field of Classification Search ............... 429/307, 429/341, 231.95, 245, 324, 326, 330, 332, 429/233
See application file for complete search history.

(56) References Cited

U.S. PATENT DOCUMENTS

| | | | |
|---|---|---|---|
| 5,871,866 A | 2/1999 | Barker et al. ............. | 429/231.1 |
| 6,068,950 A | 5/2000 | Gan et al. ................ | 429/231.9 |
| 6,203,942 B1* | 3/2001 | Gan et al. ................ | 429/332 |
| 6,908,711 B2* | 6/2005 | Fauteux et al. .......... | 429/231.5 |
| 7,160,646 B2* | 1/2007 | Ohshita et al. .......... | 429/218.1 |
| 7,192,673 B1* | 3/2007 | Ikeda et al. ............. | 429/245 |
| 2004/0023111 A1* | 2/2004 | Ohshita et al. ............ | 429/245 |

FOREIGN PATENT DOCUMENTS

| | | |
|---|---|---|
| JP | 4-123762 A | 4/1992 |
| JP | 7-114940 A | 5/1995 |
| JP | 8-88023 A | 4/1996 |
| JP | 10-106625 A | 4/1998 |
| JP | 10-188951 A | 7/1998 |
| JP | 10-255839 A | 9/1998 |
| JP | 11-67232 A | 3/1999 |
| JP | 11-233140 A | 8/1999 |

(Continued)

*Primary Examiner*—Laura Weiner
(74) *Attorney, Agent, or Firm*—Kubovcik & Kubovcik

(57) ABSTRACT

A lithium secondary battery comprising a positive electrode, a negative electrode, and a nonaqueous electrolyte, wherein the positive electrode or the negative electrode is an electrode obtained by depositing a thin film of active material capable of lithium storage and release on a current collector, the thin film is divided into columns by gaps formed therein in a manner to extend in its thickness direction and the columnar portions are adhered at their bottoms to the current collector, and the nonaqueous electrolyte contains at least one selected from phosphate ester, phosphite ester, borate ester and carboxylic ester having a fluoroalkyl group.

19 Claims, 2 Drawing Sheets

FOREIGN PATENT DOCUMENTS

| | | |
|---|---|---|
| JP | 2001-210315 A | 8/2001 |
| JP | 2002-75350 A | 3/2002 |
| JP | 2002-83594 A | 3/2002 |
| JP | 2002-93411 A | 3/2002 |
| WO | 01/31720 A1 | 5/2001 |

* cited by examiner

F I G. 1
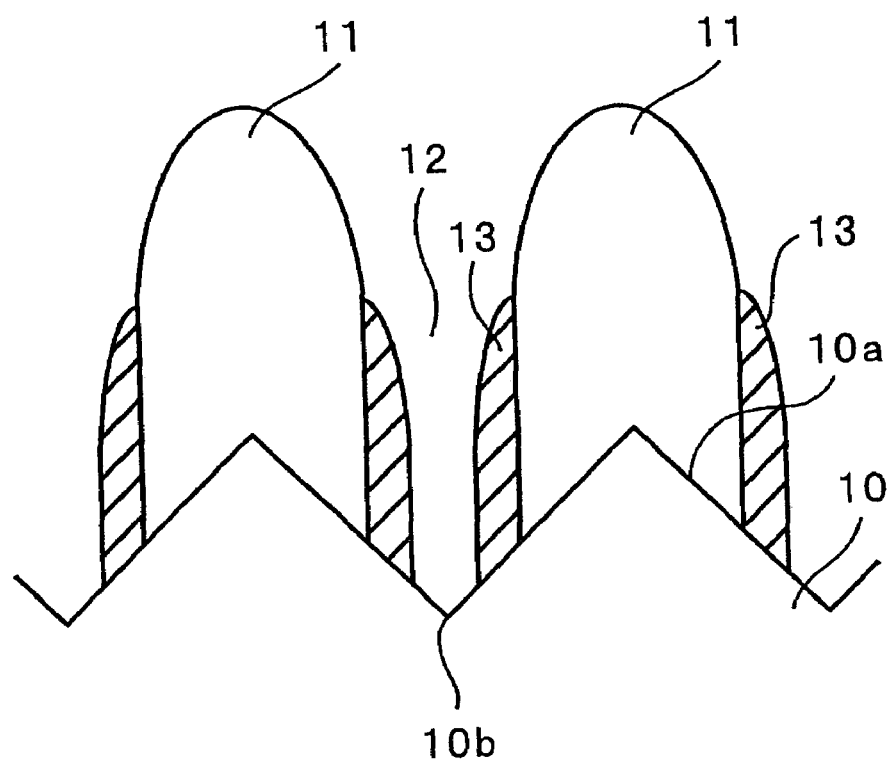

LITHIUM SECONDARY BATTERY

This application is a division of U.S. patent application Ser. No. 10/124,727 filed Apr. 18, 2002, now U.S. Pat. No. 6,800,400.

BACKGROUND OF THE INVENTION

1. Field of the Invention

The present invention relates to a lithium secondary battery, particularly to an improvement in a nonaqueous electrolyte in a lithium secondary battery using an electrode formed by depositing a thin film composed of active material capable of lithium storage and release on a current collector.

2. Related Art

In recent years, lithium secondary batteries have been actively developed. In the lithium secondary batteries, the battery characteristics thereof, such as charge-discharge voltage, charge-discharge cycle life characteristics, and storage characteristics, depend largely on the type of an electrode active material used therein.

We have found that an electrode formed by depositing a thin film of active material capable of lithium storage and release, such as an amorphous or microcrystalline silicon thin film, on a current collector exhibits high charge-discharge capacities and superior charge-discharge cycle characteristics. In such an electrode, the thin film is divided into columns by gaps formed therein in a manner to extend in its thickness direction and the bottoms of the columnar portions are adhered to the current collector. In the electrode having such a structure, spaces are formed around the columnar portions, and stress caused by expansion and shrinkage during charge-discharge cycle is relaxed by the spaces to suppress the stress that causes separation of the thin film of active material from the current collector. Therefore, superior charge-discharge cycle characteristics can be obtained.

However, in the lithium secondary battery having such an electrode, the relationship between a nonaqueous electrolyte and charge-discharge cycle characteristics has not been sufficiently investigated.

SUMMARY OF THE INVENTION

An object of the present invention is to provide a lithium secondary battery using an electrode formed by depositing a thin film of active material capable of lithium storage and release on a current collector, having further improved charge-discharge cycle characteristics.

A first aspect of the present invention is a lithium secondary battery comprising a positive electrode, a negative electrode, and a nonaqueous electrolyte, wherein the positive electrode or the negative electrode is an electrode formed by depositing a thin film of active material capable of lithium storage and release on a current collector, the thin film of active material is divided into columns by gaps formed therein in a manner to extend in its thickness direction, and the bottoms of the columnar portions are adhered to the current collector, and wherein the nonaqueous electrolyte contains at least one additive selected from phosphate ester, phosphite ester and borate ester.

In the first aspect of the present invention, the nonaqueous electrolyte contains at least one additive selected from phosphate ester, phosphite ester and borate ester; therefore, coating films containing phosphorus and/or boron are selectively formed on the side faces of the columnar portions of the thin film of active material. It can be considered that by the thus-formed coating films, the columnar structure of the thin film of active material is stabilized so that deterioration or collapse of the columnar portions is suppressed. It can also be considered that by suppressing the deterioration or the collapse of the columnar portions, the state that the bottoms of the columnar portions are adhered to the current collector is kept so that charge-discharge cycle characteristics can be improved.

The phosphate ester used in the present invention is preferably phosphate ester represented by the general formula (1), and the phosphite ester used in the present invention is preferably phosphite ester represented by the general formula (2):

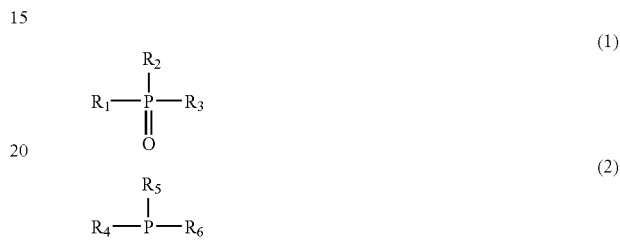

wherein $R_1$, $R_2$, $R_3$, $R_4$, $R_5$ and $R_6$ may be identical to or different from one another, and each of them represents an alkoxy group, a hydrocarbon group, a hydrocarbon group containing an ether bond, or a hydrocarbon group containing a carbonyl group, and at least one hydrogen atom therein may be substituted with a halogen atom.

When the substituents $R_1$ to $R_6$ in the general formulas (1) and (2) are alkoxy groups, the alkoxy groups are preferably alkoxy groups each having 1 to 5 carbon atoms.

Specific examples of the phosphate ester include phosphate ester compounds having the substituents shown in Table 1.

TABLE 1

| R | Compound |
|---|---|
| $R_1, R_2, R_3 = $ —$OCH_3$ | Trimethyl phosphate |
| $R_1, R_2, R_3 = $ —$OCH_2CH_3$ | Triethyl phosphate |
| $R_1, R_2, R_3 = $ —$OCH_2CH_2CH_3$ | Tripropyl phosphate |
| $R_1, R_2, R_3 = $ —$O(CH_2)_3CH_3$ | Tri-n-butyl phosphate |
| $R_1, R_2, R_3 = $ —$OCH_2CH=CH_2$ | Triallyl phosphate |
| $R_1, R_2, R_3 = $ —$OCH_2OCH_3$ | Trimethoxymethyl phosphate |
| $R_1, R_2, R_3 = $ —$OC_6H_5$ | Triphenyl phosphate |
| $R_1, R_2 = $ —$OC_6H_5$, $R_3 = $ —$CH_2CH_3$ | Diphenyl ethylphosphonate |
| $R_1, R_2 = $ —$OCH_2CH_3$, $R_3 = $ —$CHF_2$ | Diethyl difluoromethyl phosphonate |
| $R_1, R_2 = $ —$OCH_3$, $R_3 = $ —$CH_2COCH_3$ | Dimethyl 2-oxopropyl phosphonate |
| $R_1, R_2 = $ —$OCH_2CH_3$, $R_3 = $ —$CH_2COO(CH_2)_2CH_3$ | Diethyl propoxycarbonylmethylphosphonate |

Specific examples of the phosphite ester include phosphite ester compounds having the substituents shown in Table 2.

TABLE 2

| R | Compound |
|---|---|
| $R_4, R_5, R_6 = $ —$OCH_3$ | Trimethyl phosphite |
| $R_4, R_5, R_6 = $ —$OCH_2CH_3$ | Triethyl phosphite |
| $R_4, R_5, R_6 = $ —$OCH(CH_3)_2$ | Triisopropyl phosphite |
| $R_4, R_5, R_6 = $ —$O(CH_2)_3CH_3$ | Tri-n-butyl phosphite |
| $R_4, R_5, R_6 = $ —$O(CH_2)_2OCH_3$ | Tris (methoxyethyl) phosphite |

TABLE 2-continued

| R | Compound |
|---|---|
| $R_4$, $R_5$, $R_6$ = —OCH$_2$CF$_3$ | Tris (2,2,2-trifluoroethyl) phosphite |

The borate ester used in the present invention is preferably borate ester represented by the general formula (3):

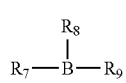

(3)

wherein $R_7$, $R_8$ and $R_9$ may be identical to or different from one another, and each of them represents an alkoxy group or a hydrocarbon group and at least one hydrogen atom therein may be substituted with a halogen atom.

When the substituents $R_7$ to $R_9$ in the general formula (3) are alkoxy groups, the alkoxy groups are preferably alkoxy groups each having 1 to 5 carbon atoms.

Specific examples of the borate ester include borate ester compounds having the substituents shown in Table 3.

TABLE 3

| R | Compound |
|---|---|
| $R_7$, $R_8$, $R_9$ = —OCH$_3$ | Trimethyl borate |
| $R_7$, $R_8$, $R_9$ = —OCF$_3$ | Tris (trifluoromethyl) borate |
| $R_7$, $R_8$, $R_9$ = —OCH$_2$CH$_3$ | Triethyl borate |
| $R_7$, $R_8$, $R_9$ = —OCH$_2$CH$_2$CH$_3$ | Tripropyl borate |
| $R_7$, $R_8$, $R_9$ = —OCH(CH$_3$)$_2$ | Triisopropyl borate |
| $R_7$, $R_8$, $R_9$ = —OC(CH$_3$)$_3$ | Tri-t-butyl borate |
| $R_7$, $R_8$, $R_9$ = —O(CH$_2$)$_4$CH$_3$ | Tri-n-pentyl borate |
| $R_7$ = —OCH$_3$, $R_8$, $R_9$ = —CH$_2$CH$_3$ | Diethylmethoxy borane |
| $R_7$ = —CH$_3$, $R_8$, $R_9$ = —OCH(CH$_3$)$_2$ | Diisopropoxymethyl borane |
| $R_7$ = —(CH$_2$)$_4$CH$_3$, $R_8$, $R_9$ = —OCH(CH$_3$)$_2$ | Isopropoxypentyl borane |

A second aspect of the present invention is a lithium secondary battery comprising a positive electrode, a negative electrode and a nonaqueous electrolyte, wherein the positive electrode or the negative electrode is an electrode formed by depositing a thin film of active material capable of lithium storage and release on a current collector, the thin film of active material is divided into columns by gaps formed therein in a manner to extend in its thickness direction, the bottoms of the columnar portions are adhered to the current collector, and the nonaqueous electrolyte contains carboxylic ester represented by the general formula (4):

(4)

wherein $R_{10}$ represents a fluoroalkyl group having 1 to 4 carbon atoms, and $R_{11}$ represents an alkyl group having 1 to 5 carbon atoms.

Specific examples of the carboxylic ester include carboxylic ester compounds having the substituents shown in Table 4.

TABLE 4

| R | Compound |
|---|---|
| $R_{10}$ = —CHF$_2$, $R_{11}$ = —CH$_3$ | Methyl difluoroacetate |
| $R_{10}$ = —CHF$_2$, $R_{11}$ = —C$_2$H$_5$ | Ethyl difluoroacetate |
| $R_{10}$ = —CHF$_2$, $R_{11}$ = —(CH$_2$)$_4$CH$_3$ | Pentyl difluoroacetate |
| $R_{10}$ = —CF$_3$, $R_{11}$ = —C$_2$H$_5$ | Ethyl trifluoroacetate |
| $R_{10}$ = —C$_2$F$_5$, $R_{11}$ = —CH$_3$ | Methyl pentafluoropropanate |
| $R_{10}$ = —C$_2$F$_5$, $R_{11}$ = —C$_2$H$_5$ | Ethyl pentafluoropropanate |
| $R_{10}$ = —(CF$_2$)$_3$CF$_3$, $R_{11}$ = —C$_2$H$_5$ | Ethyl nonafluoropentanate |

As is evident from the compounds shown in Table 4, it is unnecessary for the fluoroalkyl group in the carboxylic ester in the second aspect that all hydrogen atoms are substituted with fluoro groups. It is sufficient that at least one of the hydrogen atoms is substituted with a fluoro group.

In the second aspect of the present invention, the nonaqueous electrolyte contains the carboxylic ester having a fluoroalkyl group and represented by the general formula (4); therefore, coating films containing fluorine are selectively formed on the side faces of the columnar portions of the thin film of active material. It can be considered that by the thus-formed coating films, the columnar structure can be stabilized so that the deterioration or collapse of the columnar portions themselves can be suppressed. It can also be considered that by suppressing the deterioration or the collapse of the columnar portions, the state that the bottoms of the columnar portions are adhered to the current collector is kept so that charge-discharge cycle characteristics can be improved.

In the first and second aspects, the amount of the phosphate ester, the phosphite ester, the borate ester or the carboxylic ester is preferably 0.01 to 20 parts by weight, more preferably 0.2 to 10 parts by weight to 100 parts by weight of the total of the solvent and the solute which constitute the nonaqueous electrolyte. If the amount of the phosphate ester or the like is too small, the effect of the present invention, that is, the improvement in charge-discharge cycle characteristics may be not sufficiently obtained. If the amount of the phosphate ester or the like is too large, the electric conductivity of the nonaqueous electrolyte maybe lowered to reduce charge-discharge efficiency.

The thin film of active material in the first and second aspects is preferably formed by a method of depositing a thin film from a gas phase or a liquid phase. Examples of the method of depositing a thin film from a gas phase include CVD, sputtering, vapor evaporation, and spraying. Among these methods, CVD, sputtering and vapor evaporation are preferably employed. Examples of the method of depositing a thin film from a liquid phase include plating methods such as electroplating and electroless plating.

A thin film formed by the above-mentioned method is in general a continuous thin film. When this thin film stores lithium, the volume thereof expands. When stored lithium is released, the volume shrinks. By such expansion and shrinkage of the volume, gaps are formed in the thin film of active material.

In the first and second aspects of the present invention, the gaps are formed in a manner to expand in the thickness direction of the thin film and the thin film is divided into columns. Even if the volume of the thin film expands or shrinks by charge and discharge, the expansion and shrinkage of the volume can be accommodated by the gaps around the columnar portions, formed by the division of the thin film into the columns. As a result, the generation of stress in the thin film can be prevented. For this reason, it is possible to prevent the thin film from being pulverized or being separated from the current collector. Thus, the adhesion between the current collector and the thin film is kept so that charge-discharge cycle characteristics can be improved.

Since coating films are further formed on the side faces of the columnar portions in the present invention, the structure of the columnar portions is stabilized so that the charge-discharge cycle characteristics can be further improved.

The gaps formed by the expansion and shrinkage of the volume of the thin film of active material is preferably formed during the first or subsequent charge-discharge cycle. When the thin film of active material is formed on the current collector having irregularities on the surface thereof by a thin film forming method, low-density regions are occasionally formed upwards from the valleys of the irregularities on a surface of the current collector, as described later. The gaps may be formed along the low-density regions that extend in the thickness direction of the thin film of active material.

A third aspect of the present invention is a lithium secondary battery comprising a positive electrode, a negative electrode and a nonaqueous electrolyte, wherein the positive electrode or the negative electrode is an electrode formed by depositing a thin film of active material capable of lithium storage and release on a current collector by CVD, sputtering, vapor evaporation, spraying or plating, and the nonaqueous electrolyte contains at least one additive selected from phosphate ester, phosphite ester and borate ester.

As the phosphate ester, the phosphite ester and the borate ester in the third aspect, the same compounds as described in the first aspect can be used.

A fourth aspect of the present invention is a lithium secondary battery comprising a positive electrode, a negative electrode and a nonaqueous electrolyte, wherein the positive electrode or the negative electrode is an electrode formed by depositing a thin film of active material capable of lithium storage and release on a current collector by CVD, sputtering, vapor evaporation, spraying or plating, and the nonaqueous electrolyte contains a carboxylic ester represented by the above-mentioned general formula (4).

In the third and fourth aspects, the volume of the thin film of active material expands and shrinks during the first or subsequent charge-discharge cycle, so that gaps are formed in the thin film. The surface of the thus-formed gaps in the thin film reacts with the phosphate ester, the phosphorus ester, the borate ester or the carboxylic ester, so that coating films containing phosphorus, boron and/or fluorine are formed on the surface. The formation of the coating films makes it possible to prevent the thin film of active material from being pulverized and to improve charge-discharge cycle characteristics. It is preferred that the gaps are formed in the thickness direction of the thin film of active material and the thin film of active material is divided into columns, as in the first and second aspects.

In the third and fourth aspects, the amount of the phosphate ester, the phosphorus acid ester, the borate ester or the carboxylic ester is the same as in the first and second aspects.

The following will describe matters common to the first, second, third and fourth aspects of the present invention as "the present invention".

The thin film of active material in the present invention is a thin film capable of lithium storage and release, and is preferably composed of an active material which stores lithium by being alloyed with lithium. Examples of such an active material include silicon, germanium, tin, lead, zinc, magnesium, sodium, aluminum, potassium, and indium. Among these elements, silicon and germanium are used preferably because of high theoretical capacity thereof. Therefore, the thin film of active material used in the present invention is preferably a thin film made mainly of silicon or germanium, and is particularly preferably a silicon thin film.

In the present invention, the thin film of active material is preferably an amorphous or microcrystalline thin film. Therefore, an amorphous or microcrystalline silicon thin film is particularly preferable.

The current collector used in the present invention is not particularly limited so long as the thin film of active material can be formed thereon with good adhesion. Specific examples of the current collector include those made of at least one material selected from copper, nickel, stainless steel, molybdenum, tungsten and tantalum.

The current collector preferably has a small thickness and thus is preferably a metal foil. The current collector is preferably made of a material which is not alloyed with lithium. A particularly preferable material is copper. The current collector is preferably a copper foil, and is preferably a copper foil whose surface is roughened. Such a copper foil may be an electrolytic copper foil. The electrolytic copper foil is, for example, a copper foil obtained by immersing a metallic drum in an electrolyte solution in which copper ions are dissolved, applying the current with the rotated drum to deposit copper on the surface of the drum, and exfoliating this deposited copper. One surface or both surfaces of the electrolytic copper foil may be subjected to surface-roughening treatment or surface treatment.

A copper foil may be used in which copper is precipitated on the surface(s) (one side or both sides) of a rolled copper foil by an electrolytic process, thereby roughening the surface.

It is allowable to form an interlayer on the current collector and form the thin film of active material on the interlayer. In this case, as the interlayer, it is preferable that a layer containing a constituent which is easily diffused into the thin film of active material be used. For example, a copper layer is preferable. It is allowable to use, for example, a current collector wherein a copper layer is formed on a nickel foil (such as an electrolytic nickel foil) whose surface is roughened. Further, it is allowable to use a nickel foil whose surface is roughened by precipitating copper on a nickel foil by an electrolytic process.

In the present invention, the surface of the current collector is preferably roughened as described above. The surface roughness Ra of the current collector is preferably 0.01 µm or more, and more preferably from 0.01 to 1 µm. The surface roughness Ra is defined in JIS (Japanese Industrial Standard) B 0601-1994, and can be measured with, for example, a surface roughness meter.

By depositing the thin film of active material on the current collector having irregularities on the surface thereof, irregularities, which correspond to the irregularities on the surface of the current collector as an undercoat, can be formed on the surface of the thin film of active material. As described above, low-density regions are easily formed in the region between a valley of the irregularities on the thin film and a valley of the irregularities on the current collector. The above-mentioned gaps are formed along such a region so that the thin film of active material is divided into columns. As described above, the phosphate ester, the phosphorus acid ester, the borate ester or the carboxylic ester reacts on side faces of the thus-formed columnar portions so that coating films are formed.

It is preferable in the present invention that a constituent of the current collector is diffused into the thin film of active material. By diffusing the constituent of the current collector, satisfactory adhesion between the thin film of active material and the current collector can be kept. In the case that element such as copper which is not alloyed with lithium is diffused as the constituent of the current collector, alloying with lithium is suppressed in the diffusion areas. It is therefore possible to suppress the expansion and shrinkage of the thin film with charge-discharge reaction. Thus, it is possible to suppress the generation of such stress that causes separation of the thin film of active material from the current collector.

It is also preferable that in the thin film of active material the diffused constituent of the current collector forms a solid solution with the constituent of the thin film of active material, instead of an intermetallic compound. For example, in the case that the constituent of the current collector is copper (Cu) and the constituent of the thin film of active material is silicon (Si), it is preferable that in the thin film of active material copper and silicon form a solid solution, instead of an intermetallic compound. The intermetallic compound is a compound having a specific crystal structure wherein metals are chemically combined with each other at a specific ratio. The formation of a solid solution of the thin film constituent and the current collector constituent provides excellent adhesion between the thin film and the current collector, so that improved charge-discharge cycle characteristics can be obtained.

In the thin film of active material of the present invention, lithium maybe previously stored or added. Lithium maybe added during the thin film formation. That is, lithium may be added to the thin film by forming the thin film of active material containing lithium. Alternatively, lithium may be stored in or added to the thin film after the thin film formation. In such a case, lithium may be stored in or added to the thin film electrochemically.

In the present invention, an interlayer may be provided between the current collector and the thin film. The provision of the inter layer improves adhesion between the current collector and the thin film.

As described above, in the present invention, the nonaqueous electrolyte includes the phosphate ester, the phosphite ester, the borate ester or the carboxylic ester having a fluoroalkyl group. The nonaqueous electrolyte in the present invention includes such an additive, and is composed of a solvent and a solute. The type of the solvent is not particularly limited so long as the solvent is generally used in lithium secondary batteries. Examples thereof include cyclic carbonates such as ethylene carbonate, propylene carbonate, butylene carbonate and vinylene carbonate; and chain carbonates such as dimethyl carbonate, diethyl carbonate and methyl ethyl carbonate. Preferably, a mixed solvent of a cyclic carbonate and a chain carbonate is used. It is allowable to use a mixed solvent of the above-mentioned cyclic carbonate, and an ether solvent such as 1,2-dimethoxyethane and 1,2-diethoxyethane, or a chain ester such as γ-butyrolactone, sulfolane or methyl acetate.

The type of the solute of the nonaqueous electrolyte is not particularly limited so long as the solute is generally used in lithium secondary batteries. Examples thereof include $LiPF_6$, $LiBF_4$, $LiCF_3SO_3$, $LiN(CF_3SO_2)_2$, $LiN(C_2F_5SO_2)_2$, $LiN(CF_3SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. A mixed solute of $LiXFy$ [wherein X represents P, As, Sb, B, Bi, Al, Ga or In, when X represents P, As or Sb, y is 6, and when X represents B, Bi, Al, Ga or In, y is 4], and lithium perfluoroalkylsulfonic imide $LiN(C_mF_{2m+1}SO_2)(C_nF_{2n+1}SO_2)$ [wherein m and n each independently represents an integer of 1 to 4] or lithium perfluoroalkyl sulfonic methide $LiC(C_pF_{2p+1}SO_2)(C_qF_{2q+1}SO_2)(C_rF_{2r+1}SO_2)$ [wherein p, q and r each independently represents an integer of 1 to 4] is particularly preferable. Among these solutes, a mixed solute of $LiPF_6$ and $LiN(C_2F_5SO_2)_2$ is particularly preferable.

As the nonaqueous electrolyte, there may be used a gel polymer electrolyte wherein a polymer electrolyte such as polyethylene oxide, polyacrylonitrile or polyfluorovinylidene is impregnated with electrolyte solution, or an inorganic solid electrolyte such as LiI or $Li_3N$.

The electrolyte of the lithium secondary battery of the present invention can be used without limitation so far as a Li compound as a solute for exhibiting ion conductivity and a solvent for dissolving and holding the solute are not decomposed by voltage at the time when the battery is charged, discharged, or stored.

In the present invention, when the thin film of active material capable of lithium storage and release is made of a material having a negative potential, such as a silicon thin film, such an electrode is generally used as a negative electrode. Examples of a positive active material in this case include lithium-containing transition metal oxides such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$; and lithium-free metal oxides such as $MnO_2$. Other substances can also be used, without limitation, if they are capable of electrochemical insertion and release of lithium.

FIG. 1 is a schematic sectional view illustrating a surface state of an electrode in the present invention. As illustrated in FIG. 1, a thin film of active material 11 is formed on a surface 10a of a current collector 10. Irregularities are defined on the surface 10a of the current collector 10. By a gap 12 formed over a valley 10b of the irregularities, the thin film of active material 11 is divided into columns. Accordingly, spaces are defined around the columnar portions of the thin film of active material 11, so that expansion and shrinkage of the thin film of active material 11 with charge and discharge can be accommodated by the spaces. Coating films 13 are formed on the side faces of the columnar portions of the thin film of active material 11. The coating films 13 are formed from phosphate ester, phosphite ester, borate ester or carboxylic ester contained in the nonaqueous electrolyte. The coating films accordingly contain phosphorus, boron, or fluorine.

By forming such coating films 13 on the side faces of the columnar portions 11, the columnar structure is stabilized, so that deterioration or collapse of the columnar portions 11 is suppressed and the adhesion between the bottom of the columnar portion 11 and the current collector 10 can be kept good. Therefore, the charge-discharge cycle characteristics of the battery can be improved.

BRIEF DESCRIPTION OF THE DRAWINGS

FIG. 1 is a schematic sectional view illustrating an electrode surface in the present invention.

DESCRIPTION OF THE PREFERRED EMBODIMENTS

Figure 2:
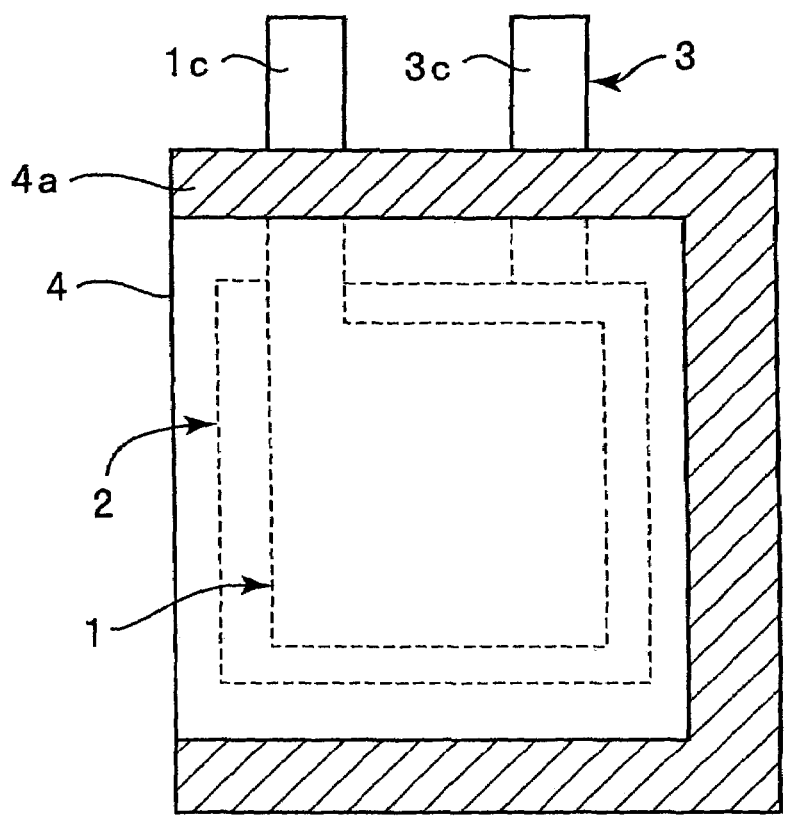
FIG. 2 is a plan view illustrating a lithium secondary battery manufactured in an embodiment of the present invention.

The present invention will be described in more detail by way of examples. However, the present invention is not limited to the following examples, and the examples may be appropriately changed or modified without departing from the scope of the present invention.

EXAMPLE 1

[Manufacture of Negative Electrode]

As a current collector, an electrolytic copper foil (thickness: 18 μm, and surface roughness Ra: 0.188 μm) was used. A silicon thin film was formed on the electrolytic copper foil by RF sputtering. Conditions for the sputtering are as follows: sputtering gas (Ar) flow rate: 100 sccm, substrate temperature: room temperature (not heated), reaction pressure: 0.133 Pa ($1.0 \times 10^{-3}$ Torr), and radio frequency power: 200 W. The silicon thin film was deposited to have a thickness of about 5 μm. The resultant silicon thin film was subjected to Raman spectroscopic analysis. As a result, a peak around 480 cm$^{-1}$ was detected, while a peak around 520 cm$^{-1}$ was not detected. It was accordingly found that the resultant silicon thin film was an amorphous silicon thin film.

The electrolytic copper foil on which the amorphous silicon thin film was formed was cut out into a size of 2.5 cm×2.5 cm and then dried at 100° C. in vacuum for 2 hours, to obtain a negative electrode.

[Manufacture of Positive Electrode]

85% by weight of LiCoO$_2$ powder having a mean particle diameter of 10 μm, 10% by weight of carbon powder as a conductive material, and 5% by weight of polyfluorovinylidene as a binder were mixed, and N-methylpyrrolidone was added to the resultant mixture and kneaded to prepare a slurry. This slurry was applied to one side face of a current collector made of an aluminum foil having a thickness of 20 μm by a doctor blade method. This was dried at 100° C. in vacuum for 2 hours, and then cut out into a size of 2.0 cm×2.0 cm to obtain a positive electrode.

[Preparation of Electrolyte A]

Two parts by weight of trimethyl phosphate were mixed with 100 parts by weight of the electrolyte prepared by dissolving 1 mol/liter (1.0M) of LiPF$_6$ in a mixed solvent containing ethylene carbonate (EC) and diethyl carbonate (DEC) at a volume ratio of 3:7, to prepare an electrolyte A.

[Preparation of Electrolyte B]

Two parts by weight of triethyl phosphite were mixed with 100 parts by weight of the electrolyte prepared by dissolving 1 mol/liter of LiPF$_6$ in a mixed solvent containing ethylene carbonate and diethyl carbonate at a volume ratio of 3:7, to prepare an electrolyte B.

[Preparation of Electrolyte C]

Two parts by weight of tributyl borate were mixed with 100 parts by weight of the electrolyte prepared by dissolving 1 mol/liter of LiPF$_6$ in a mixed solvent containing ethylene carbonate and diethyl carbonate at a volume ratio of 3:7, to prepare an electrolyte C.

[Preparation of Electrolyte D]

1 mol/liter of LiPF$_6$ was dissolved in a mixed solvent containing ethylene carbonate and diethyl carbonate at a volume ratio of 3:7, to prepare an electrolyte D.

[Manufacture of a Battery]

In a glove box with an atmosphere of argon gas, the above obtained positive and negative electrodes were attached to each other through a microporous membrane made of polyethylene and inserted into an outer package made of an aluminum lamination. 500 μl of each of the electrolytes A to D was poured into the package to manufacture a lithium secondary battery. The design capacity of the battery is 14 mAh.

FIG. 2 is a plan view illustrating the manufactured lithium secondary battery. As illustrated in FIG. 2, a positive electrode 1 and a negative electrode 3 are combined with each other through a separator 2 made of a polyethylene microporous membrane and inserted into an outer package 4. After inserting into the outer package 4, an electrolyte is poured therein, and a sealing portion 4a of the outer package 4 is sealed to manufacture a lithium secondary battery.

Figure 3:
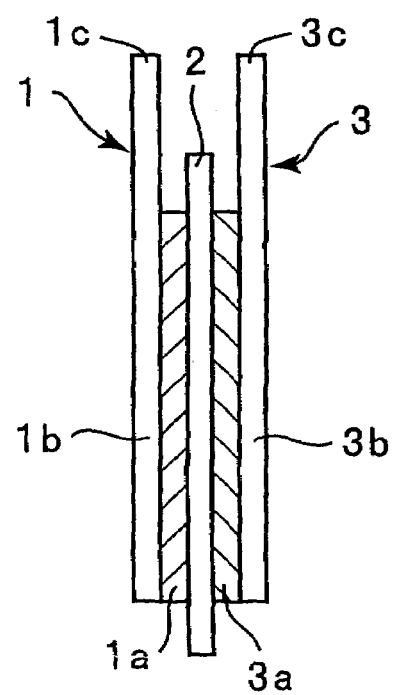
FIG. 3 is a sectional view illustrating a structure of electrodes in the lithium secondary battery shown in FIG. 2.

FIG. 3 is a sectional view illustrating the electrodes combined with each other inside the battery. As illustrated in FIG. 3, the positive electrode 1 and the negative electrode 3 are combined to be opposite to each other through the separator 2. In the positive electrode 1, a positive active material layer 1a is provided on a positive current collector 1b made of aluminum, and the positive active material layer 1a contacts the separator 2. In the negative electrode 3, a negative active material layer 3a is provided on a negative current collector 3b made of copper, and the negative active material layer 3a contacts the separator 2.

As illustrated in FIG. 3, a positive tab 1c for leading-out which is made of aluminum is attached to the positive current collector 1b. A negative tab 3c for leading-out which is made of nickel is also attached to the negative current collector 3b.

[Measurement of Charge-Discharge Cycle Characteristics]

Charge-discharge cycle characteristics of each battery of Examples 1 to 3 and Comparative Example 1 using the electrolytes A, B, C and D, respectively, were evaluated.

Charge was performed up to 4.20 V at a constant current of 14 mA, and performed up to 0.7 mA at a constant voltage of 4.20V. Discharge was performed up to 2.75V at a constant current of 14 mA. This charge-discharge unit was recorded as one cycle. The capacity retention rate after 70 cycles was obtained from the following equation. The results are shown in Table 5. The measurement was made at 25° C.

Capacity retention rate (%)=(discharge capacity at the 70th cycle/discharge capacity at the first cycle)×100

TABLE 5

| | Electrolyte | Discharge Capacity at the 1st Cycle (mAh) | Discharge capacity at the 70th Cycle (mAh) | Capacity Retention Rate (%) |
|---|---|---|---|---|
| Example 1 (A) | 1.0 M LiPF$_6$ EC/DEC (3/7) + 2 Parts by Weight of Trimethyl Phosphate | 13.0 | 8.1 | 62.4 |
| Example 2 (B) | 1.0 M LiPF$_6$ EC/DEC (3/7) + 2 Parts by Weight of Triethyl Phosphite | 13.7 | 8.4 | 61.2 |
| Example 3 (C) | 1.0 M LiPF$_6$ EC/DEC (3/7) + 2 Parts by Weight of Tributyl Borate | 13.4 | 8.3 | 62.0 |
| Comparative Example 1 (D) | 1.0 M LiPF$_6$ EC/DEC (3/7) | 13.5 | 7.8 | 57.5 |

As is evident from the results shown in Table 5, Examples 1 to 3 in which trimethyl phosphate, triethyl phosphite, or tributyl borate was added to the nonaqueous electrolyte, exhibit higher capacity retention rates than Comparative Example 1, and therefore are excellent in charge-discharge cycle characteristics.

EXAMPLE 2

[Manufacture of Negative and Positive Electrodes]

A negative electrode and a positive electrode were manufactured in the same manner as in Example 1.

[Preparation of Electrolyte E]

Five parts by weight of ethyl difluoroacetate were mixed with 100 parts by weight of the electrolyte prepared by dissolving 1 mol/liter of $LiPF_6$ in a mixed solvent containing ethylene carbonate and diethyl carbonate at a volume ratio of 3:7, to prepare an electrolyte E.

[Preparation of Electrolyte F]

Five parts by weight of ethyl trifluoroacetate were mixed with 100 parts by weight of the electrolyte prepared by dissolving 1 mol/liter of $LiPF_6$ in a mixed solvent containing ethylene carbonate and diethyl carbonate at a volume ratio of 3:7, to prepare an electrolyte F.

[Manufacture of Battery]

A lithium secondary battery was manufactured in the same way in as Example 1 except that the electrolyte E or F was used.

[Measurement of Charge-Discharge Cycle Characteristics]

Charge-discharge cycle characteristics of each battery of Examples 4 and 5 using the electrolytes E and F, respectively, were evaluated in the same manner as in Experiment 1. The capacity retention rates thereof are shown in Table 6. Table 6 also shows the evaluation result of Comparative Example 1 in Experiment 1.

TABLE 6

| | Electrolyte | Discharge Capacity at the 1st Cycle (mAh) | Discharge Capacity at the 70th Cycle (mAh) | Capacity Retention Rate (%) |
|---|---|---|---|---|
| Example 1 (E) | 1.0 M $LiPF_6$ EC/DEC (3/7) + 5 Parts by Weight of Ethyl Difluoroacetate | 13.4 | 8.8 | 65.4 |
| Example 2 (F) | 1.0 M $LiPF_6$ EC/DEC (3/7) + 5 Parts by Weight of Ethyl Trifluroacetate | 13.2 | 8.7 | 66.3 |
| Comparative Example 1 (D) | 1.0 M $LiPF_6$ EC/DEC (3/7) | 13.5 | 7.8 | 57.5 |

As is evident from the results shown in Table 6, Examples 4 and 5 using the electrolytes to which ethyl difluoroacetate or ethyl trifluoroacetate in accordance with the present invention were added exhibit higher capacity retention rates than Comparative Example 1, and, therefore, are excellent in charge-discharge cycle characteristics.

According to the present invention, the charge-discharge cycle characteristics of a lithium secondary battery can be improved.

What is claimed is:

1. A lithium secondary battery comprising a positive electrode, a negative electrode, and a nonaqueous electrolyte, wherein said positive electrode or said negative electrode is an electrode obtained by depositing a thin film composed of active material capable of lithium storage and release on a current collector, the thin film is divided into columns by gaps formed therein in a manner to extend in its thickness direction, and said columnar portions are adhered at their bottoms to said current collector, and wherein said nonaqueous electrolyte contains at least one selected from phosphate ester, phosphite ester and borate ester.

2. The lithium secondary battery according to claim 1, wherein said phosphate ester is represented by the general formula (1), and/or said phosphite ester is represented by the general formula (2):

wherein $R_1$, $R_2$, $R_3$, $R_4$, $R_5$ and $R_6$ may be identical to or different from one another and each of them represents an alkoxy group, a hydrocarbon group, a hydrocarbon group containing an ether bond, or a hydrocarbon group containing a carbonyl group, and at least one hydrogen atom therein may be substituted with a halogen atom.

3. The lithium secondary battery according to claim 2, wherein the alkoxy group in said general formulas (1) or (2) is an alkoxy group having 1 to 5 carbon atoms.

4. The lithium secondary battery according to claim 1, wherein said borate ester is represented by the general formula (3):

wherein $R_7$, $R_8$ and $R_9$ may be identical to or different from one another, and each of them represents an alkoxy group or a hydrocarbon group, and at least one hydrogen atom therein may be substituted with a halogen atom.

5. The lithium secondary battery according to claim 4, wherein the alkoxy group in said general formula (3) is an alkoxy group having 1 to 5 carbon atoms.

6. The lithium secondary battery according to claim 1, wherein said thin film is formed by CVD, sputtering, vapor evaporation, spraying or plating.

7. The lithium secondary battery according to claim 1, wherein said gaps are formed during the first or subsequent charge-discharge cycle.

8. The lithium secondary battery according to claim 1, wherein said gaps are formed along low-density regions that extend in the thickness direction of said thin film.

9. The lithium secondary battery according to claim 1, wherein said thin film is an amorphous thin film or a microcrystalline thin film.

10. The lithium secondary battery according to claim 1, wherein said thin film is an amorphous silicon thin film or a microcrystalline silicon thin film.

11. The lithium secondary battery according to claim 1, wherein said current collector is made of at least one selected from copper, nickel, stainless steel, molybdenum, tungsten and tantalum.

12. The lithium secondary battery according to claim 1, wherein a surface roughness Ra of said current collector is in the range of 0.01 to 1 μm.

13. The lithium secondary battery according to claim 1, wherein said current collector is a copper foil.

14. The lithium secondary battery according to claim 13, wherein said copper foil is a copper foil whose surface is roughened.

15. The lithium secondary battery according to claim 13, wherein said copper foil is an electrolytic copper foil.

16. The lithium secondary battery according to claim 1, wherein a constituent of said current collector is diffused into said thin film.

17. The lithium secondary battery according to claim 16, wherein said diffused current collector constituent forms, in said thin film, a solid solution, instead of an intermetallic compound, with a component of said thin film.

18. The lithium secondary battery according to claim 1, wherein said nonaqueous electrolyte contains a mixed solvent composed of two or more solvents.

19. The lithium secondary battery according to claim 18, wherein said mixed solvent contains a cyclic carbonate and a chain-form carbonate, and contains ethylene carbonate as the cyclic carbonate.

* * * * *